US010106240B2

(12) United States Patent
Lakic et al.

(10) Patent No.: US 10,106,240 B2
(45) Date of Patent: Oct. 23, 2018

(54) PINNED FUSELAGE-TO-WING CONNECTION

(71) Applicant: The Boeing Company, Chicago, IL (US)

(72) Inventors: Branko Lakic, Kirkland, WA (US); David H. Leibov, Seattle, WA (US)

(73) Assignee: The Boeing Company, Chicago, IL (US)

( * ) Notice: Subject to any disclaimer, the term of this patent is extended or adjusted under 35 U.S.C. 154(b) by 391 days.

(21) Appl. No.: 14/798,220

(22) Filed: Jul. 13, 2015

(65) Prior Publication Data

US 2017/0015402 A1    Jan. 19, 2017

(51) Int. Cl.
*B64C 1/26* (2006.01)

(52) U.S. Cl.
CPC ....................... *B64C 1/26* (2013.01)

(58) Field of Classification Search
CPC ........................................ B64C 1/26
See application file for complete search history.

(56) References Cited

U.S. PATENT DOCUMENTS

| 1,437,469 | A |   | 12/1922 | Gilmore et al. |            |
|-----------|---|---|---------|----------------|------------|
| 2,066,649 | A |   | 1/1937  | Sabins         |            |
| 2,370,801 | A | * | 3/1945  | Klose          | B64C 3/00  |
|           |   |   |         |                | 244/123.8  |
| 2,425,099 | A |   | 8/1947  | Klose          |            |
| 2,538,433 | A |   | 1/1951  | Snyder         |            |
| 2,603,437 | A |   | 7/1952  | Satre          |            |
| 3,451,646 | A |   | 6/1969  | Aarnaes        |            |
| 4,444,365 | A |   | 4/1984  | Heuberger      |            |
| 4,998,689 | A |   | 3/1991  | Woodcock       |            |
| 5,332,178 | A | * | 7/1994  | Williams       | B29C 70/446 |
|           |   |   |         |                | 244/117 R  |
| 7,131,611 | B2|   | 11/2006 | Ferman         |            |
| 7,546,979 | B1|   | 6/2009  | Estell et al.  |            |
| 7,887,009 | B2| * | 2/2011  | Keeler, Jr.    | B64C 1/26  |
|           |   |   |         |                | 244/119    |
| 8,157,206 | B2|   | 4/2012  | Gionta et al.  |            |
| 8,186,621 | B2| * | 5/2012  | Manzano        | B64C 1/26  |
|           |   |   |         |                | 244/119    |
| 8,371,532 | B2|   | 2/2013  | Williams et al.|            |
| 9,096,324 | B2| * | 8/2015  | Erickson       | B64C 1/06  |

(Continued)

FOREIGN PATENT DOCUMENTS

| FR | 2991287 A1 | 12/2013 |
|----|------------|---------|
| GB | 557729 A   | 12/1943 |

OTHER PUBLICATIONS

Search Report for related European Application No. EP16178597.7; report dated Nov. 28, 2016.

*Primary Examiner* — Brian M O'Hara
*Assistant Examiner* — Keith L Dixon
(74) *Attorney, Agent, or Firm* — Miller, Matthias & Hull LLP

(57) ABSTRACT

An aircraft comprises a fuselage, a wing assembly, and a pinned fuselage-to-wing connection including a forward pin joint, an aft pin joint, and intermediate pin joints between the forward and aft pin joints. The intermediate pin joints have pins aligned in an axial direction and are configured to slide along the axial direction without transferring axial loads from the wing assembly to the fuselage. At least one of the forward and aft pin joints is constrained to prevent translation along the axial direction.

18 Claims, 5 Drawing Sheets

(56) References Cited

U.S. PATENT DOCUMENTS

| | | | |
|---|---|---|---|
| 9,221,532 B2* | 12/2015 | Karem | B64C 1/0009 |
| 9,227,718 B2* | 1/2016 | Cominsky | B64C 1/26 |
| 9,399,508 B2* | 7/2016 | Lakic | B64C 1/26 |
| 9,475,570 B2* | 10/2016 | Charles | B64C 3/182 |
| 9,580,164 B2* | 2/2017 | Zeon | B64C 1/26 |
| 2008/0283666 A1 | 11/2008 | Grieve et al. | |
| 2009/0146007 A1 | 6/2009 | Keeler, Jr. et al. | |
| 2011/0089292 A1* | 4/2011 | Williams | B64C 1/26 244/131 |
| 2011/0147521 A1* | 6/2011 | Delahaye | B64C 1/26 244/119 |
| 2014/0103162 A1 | 4/2014 | Thomas et al. | |

* cited by examiner

PINNED FUSELAGE-TO-WING CONNECTION

BACKGROUND

Aerodynamic forces applied to a wing of an aircraft cause the wing to primarily bend vertically and twist forward in flight. In a large jetliner, these wing bending deflections can induce undesirable loads in the fuselage, creating challenges in achieving efficient designs where the wing and fuselage are joined together (the "wing-to-body connection"). These forces act on the fuselage, primarily in the aircraft vertical, lateral, and axial directions. Further, the vertical force creates a bending moment. Additional fuselage loads at the wing-to-body connection are produced by changes in pressure within the fuselage.

A "rigid" wing-to-body connection may be designed to transfer all wing bending deflections to the fuselage components at the connection interface. As a result, these designs cause fuselage components to rotate and bend in unison with the wing. A "compliant" wing-to-body connection may instead be designed to transfer vertical, lateral and axial loads without transferring wing bending deflections such that the wing can bend independently of the fuselage.

Compliant designs have historically used a few isolated complex mechanical linkages and/or pins. However, these designs require heavy wing and fuselage structure to support large loads which concentrate at the few discrete wing-to-body connection locations.

These heavy structures add weight to the aircraft. The added weight increases fuel consumption and other aircraft operating costs.

SUMMARY

An aircraft comprises a fuselage, a wing assembly, and a pinned fuselage-to-wing connection including a forward pin joint, an aft pin joint, and intermediate pin joints between the forward and aft pin joints. The intermediate pin joints have pins aligned in an axial direction and are configured to slide along the axial direction without transferring axial loads from the wing assembly to the fuselage. At least one of the forward and aft pin joints is constrained to prevent translation along the axial direction.

A connection for a wing and a fuselage of an aircraft comprises a forward pin joint, an aft pin joint, and a plurality of intermediate pin joints between the forward and aft pin joints. The intermediate pin joints have pins aligned in an axial direction and are configured to slide along the axial direction without transferring axial loads. At least one of the forward and aft pin joints is constrained to prevent translation along the axial direction.

A connection for a wing and a fuselage of an aircraft comprises a forward pin joint, an aft pin joint, a plurality of intermediate pin joints between the wing and the fuselage, and a shear plate. All of the pin joints have pins aligned along a p-axis. Each pin allows the wing to bend without inducing rotational deflection to the fuselage at the connection. The aft pin joint is constrained to prevent translation along the p-axis. The shear plate is configured to be flexible for rotation around the p-axis and to transfer axial loads to the fuselage.

An aircraft comprises a fuselage, a wing assembly, and a pinned fuselage-to-wing connection including a plurality of pin joints outboard of the fuselage allowing the wing assembly to bend without inducing rotational deflection to the fuselage at the pinned connection.

These features and functions may be achieved independently in various embodiments or may be combined in other embodiments. Further details of the embodiments can be seen with reference to the following description and drawings.

DETAILED DESCRIPTION

Figure 1:
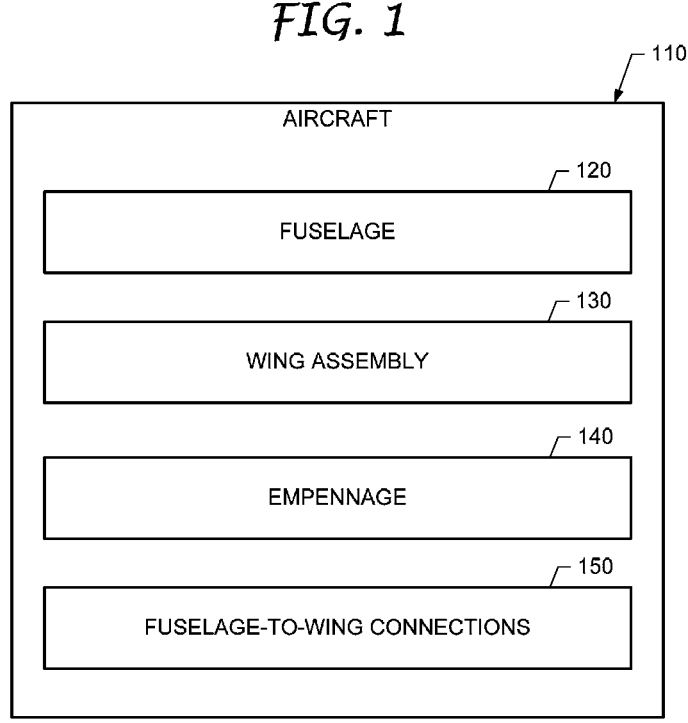
FIG. 1 is an illustration of aircraft.

Reference is made to FIG. 1, which illustrates an aircraft 110 including a fuselage 120, a wing assembly 130 and an empennage 140. The fuselage 120 includes skin and a stiffening substructure, such as a collection of hoop-shaped frames and stiffeners.

The fuselage 120 has the following global (X-Y-Z) Cartesian coordinate system, which does not change orientation regardless of which point (anywhere on the aircraft 110) is being considered.

X-axis=Axial direction from nose to tail and is the axis of rotation of the cylindrical portion of the fuselage 120.

Y-axis=Lateral direction from middle of the fuselage 120 towards the right wing tip.

Z-axis=Vertical direction pointing up (when flying straight and level).

The wing assembly 130 may include a wing box, a leading edge, and a trailing edge. The wing box includes a front spar and a rear spar, and a plurality of ribs between the spars. The spars extend in a spanwise direction, and the ribs extend in a chordwise direction. The ribs include side of body ribs, which are located at or near the connection of the wing assembly 130 to the fuselage 120. The wing box may also include stringers. The wing box further includes skin covering the spars and ribs. The skin may include upper skin panels and lower skin panels. The wing assembly 130 may have a swept wing configuration, but it is not limited to a swept wing configuration.

The wing assembly 130 is connected to the fuselage 120 by pinned fuselage-to-wing connections 150. During flight of the aircraft 110, aerodynamic forces on the wing assembly 130 create loads at the fuselage-to-wing connections 150, primarily in the aircraft axial, lateral and vertical directions. Additional fuselage loads at the fuselage-to-wing connections 150 are produced by fuselage deformation, which is caused by pressure within the fuselage 120, and frame bending. Bending moments at the fuselage-to-wing connection 150 are produced by several factors, including wing bending and fuselage deformation. The pinned fuselage-to-wing connections 150 transfer the vertical, lateral and axial loads to the fuselage 120, but allows the wing assembly 130 to bend without transferring rotational deflections to the fuselage 120.

Figure 2:
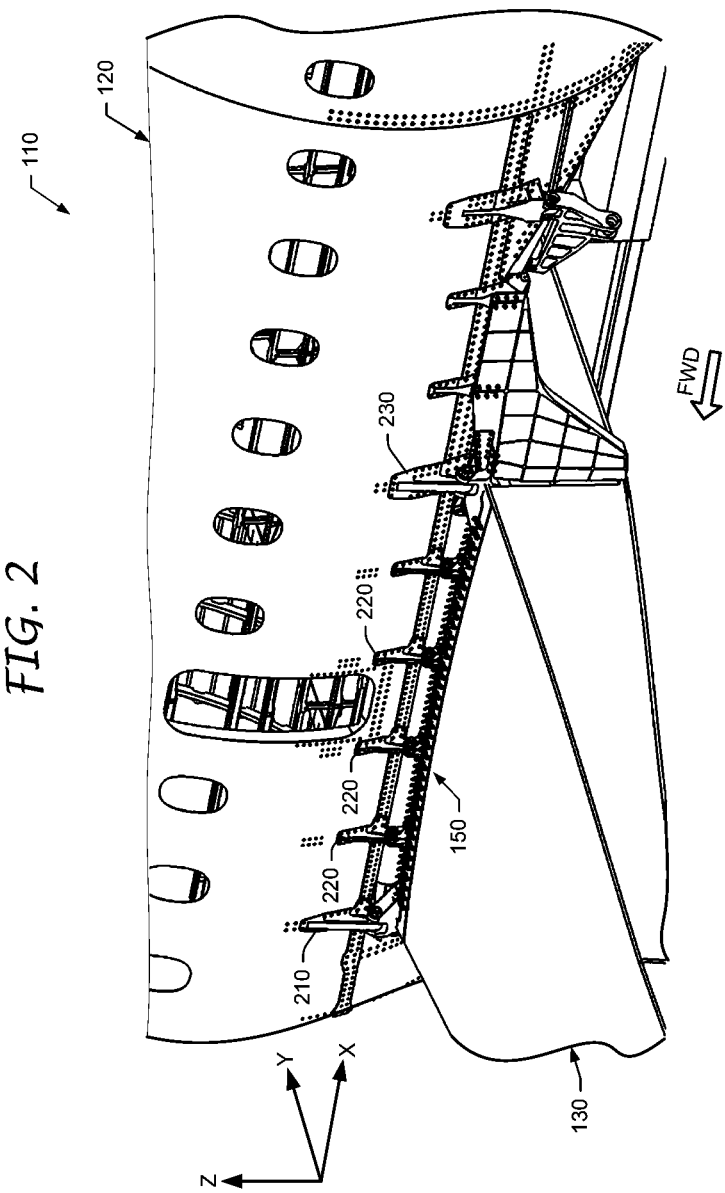
FIG. 2 is an illustration of an example of a pinned fuselage-to-wing connection for the aircraft.

Reference is made to FIG. 2, which illustrates a pinned fuselage-to-wing connection 150 at the port side of the aircraft 110 (another fuselage-to-wing connection 150 is made at the starboard side of the aircraft 110). The fuselage-to-wing connection 150 includes a forward pin joint 210, an aft pin joint 230, and a plurality of intermediate pin joints 220. Each pin joint 210, 220 and 230 connects a discrete location of the wing assembly 130 to a frame of the fuselage 120.

The intermediate pin joints 220 are attached to the wing assembly 130 between the front and rear spars. For instance, each intermediate pin joint 220 is attached to a side of body rib of the wing assembly 130. The intermediate pin joints have their pins aligned in the axial direction along a p-axis (illustrated in FIG. 3). The p-axis is parallel to the X-axis.

In one configuration, the forward pin joint 210 is attached to both the front spar and the side of body rib of the wing assembly 130. The aft pin joint 230 is attached to both the rear spar and the side of body rib of the wing assembly 130. Pins of the forward and aft pin joints 210 and 230 are aligned along the p-axis with the pins of the intermediate pin joints 220.

In another configuration, the forward pin joint 210 is attached to only the front spar, and the aft pin joint 230 is attached to only the rear spar. In this configuration, the pins of the forward and aft pin joints 210 and 230 are not necessarily aligned with the pins of the intermediate pin joints 220. If all of the pins of the pin joints 210-230 are not aligned, some induced forces may be generated as they rotate.

Figure 3:
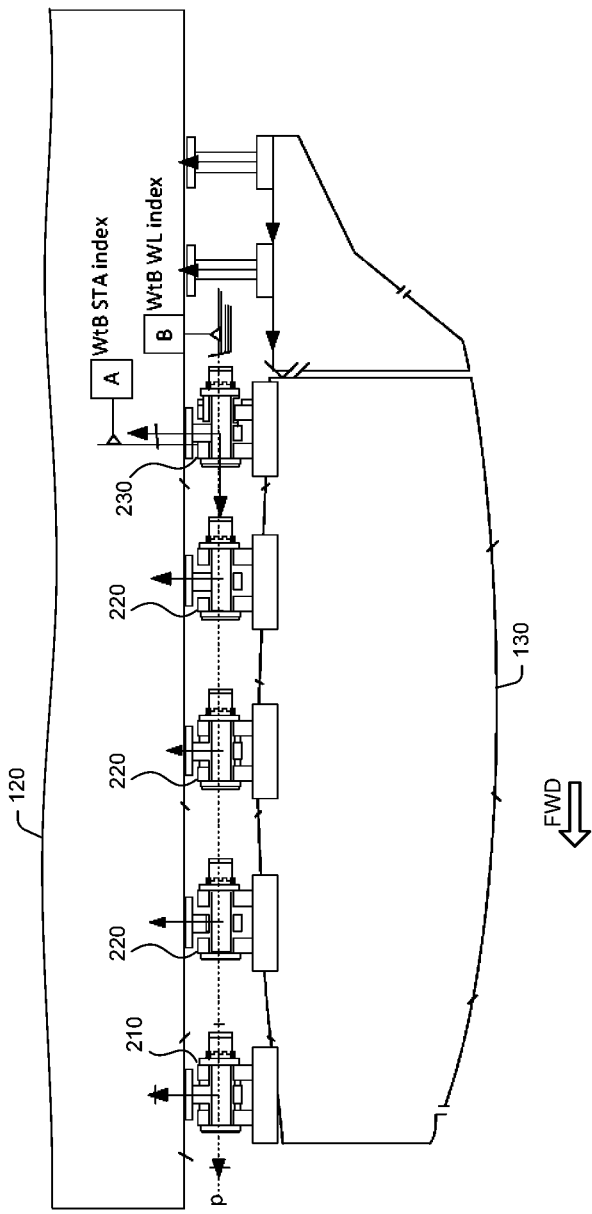
FIG. 3 is an illustration of loads acting on pin joints of the fuselage-to-wing connection.

Reference is now made to FIG. 3, which illustrates some of the different loads acting on the pin joints 210-230. The pin joints 210-230 allow rotation about the p-axis. The pin rotation allows the wing to bend without inducing rotational forces to the fuselage 120 at these connections 150.

In one particular configuration, the forward pin joint 210 and/or the aft pin joint 230 are constrained to prevent translation along the p-axis. The intermediate pin joints 220 are not so constrained. Thus, only the forward pin joint 210 and/or the aft pin joint 230 transfer axial loads to the fuselage 120. All of the pin joints 210-230 allow rotation such that the wing assembly 130 can bend without inducing rotational forces to the fuselage 120.

Figure 4:
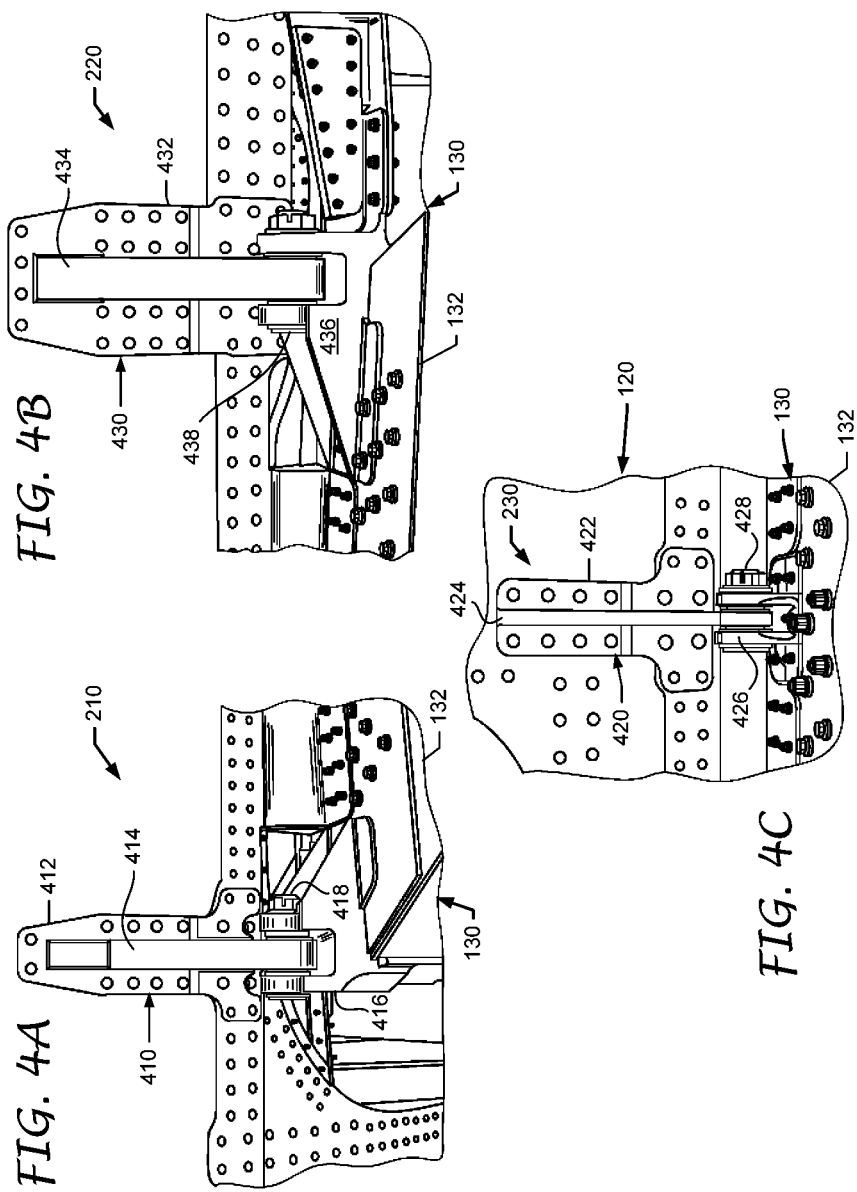
FIGS. 4A-4C are illustrations of different pin joints for the pinned fuselage-to-wing connection.

Reference is made to FIGS. 4A, 4B and 4C, which illustrate examples of the forward pin joint 210, intermediate pin joint 220, and aft pin joint 230. Each pin joint 210, 220 and 230 includes a fitting 410, 420 and 430 having a flange 412, 422 and 432 and a lug 414, 424 and 434. Each flange 412, 422 and 432 is fastened to a frame of the fuselage 120. Each pin joint 210, 220 and 230 further includes a clevis 416, 426 and 436 that is fastened to the wing assembly 130. Each lug 414, 424 and 434 is located between prongs of its corresponding clevis 416, 426 and 436. A pin 418, 428 and 438 is inserted through aligned holes in the lug and prongs. A bearing may be used between each pin 418, 428 and 438 and each lug 414, 424 and 434.

All of the pin joints 210, 220 and 230 are configured to transfer loads in the pin radial direction (including lateral and vertical loads) to the fuselage 120. The amount of lug-to-clevis spacing, if any, of each pin joint 210, 220 and 230 determines the amount of translation along the p-axis.

The intermediate pin joint 220 of FIG. 4B may be a "slide-type" fitting 420. Pins 428 of the intermediate pin joints 220 are aligned along the p-axis. A slide-type fitting 420 is configured to slide along the p-axis without transferring the axial loads from the wing assembly 130 to the fuselage 120. Each clevis 426 shares common fasteners with a side of body rib at an upper wing skin panel 132 of the wing assembly 130.

The aft pin joint 230 of FIG. 4C is configured to transfer axial loads along the p-axis to the fuselage 120. The fitting 430 of the aft pin joint 230 does not slide along the p-axis. The clevis 436 of the aft pin joint 230 shares common fasteners with a side of body rib and rear spar at the upper wing skin panel 132 of the wing assembly 130.

The forward pin joint 210 of FIG. 4A is constrained for partial translation along the p-axis. Space between the lug 414 and the clevis 416 enables the fitting 410 to slide over a range of limited motion without transferring axial loads from the wing assembly 130 to the fuselage 120. Once the range has been met, the forward pin joint 210 transfers axial loads to the fuselage 120. The clevis 416 shares common fasteners with a side of body rib and front spar at the upper wing skin panel 132 of the wing assembly 130.

More generally, however, at least one of the pin joints 210-230 is constrained to prevent translation along the p-axis. One or more of the other pin joints may be similarly constrained, or constrained for partial translation along the p-axis, or unconstrained with respect to translation along the p-axis.

Figure 5:
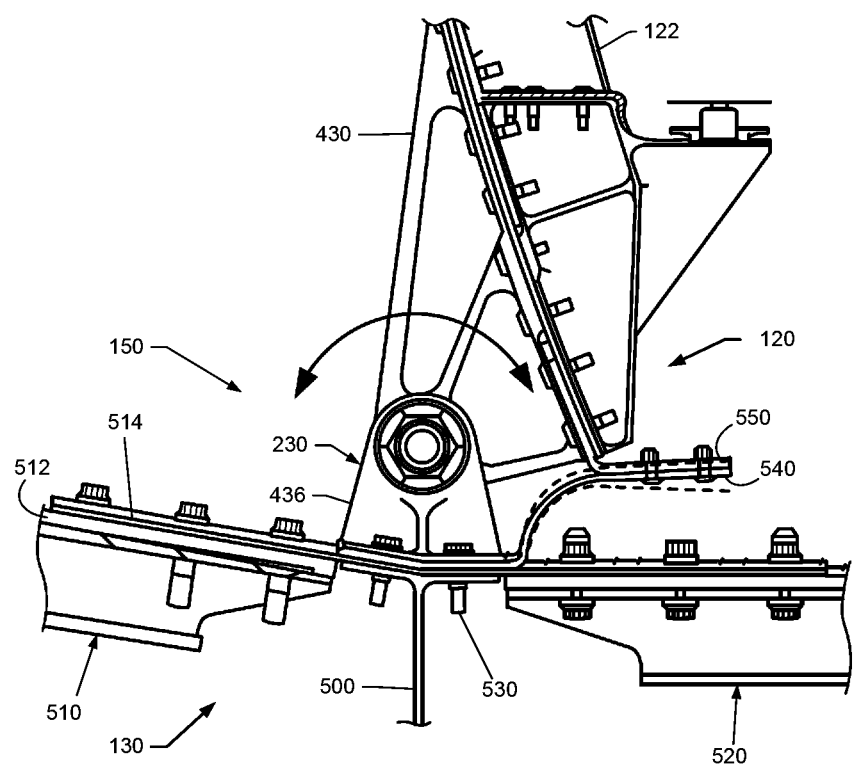
FIG. 5 is an illustration of a pinned fuselage-to-wing connection including a shear plate.

FIG. 5. Illustrates a portion of the pinned fuselage-to-wing connection 150 at the side of body rib. At both its upper wing skin panel 512 and lower wing skin panel (not shown), an outer wing 510 is connected to a central wing box 520 by an upper splice plate 514 and lower splice plate (not shown). A side of body rib 500 is fastened to the upper splice plate 514 and the lower splice plate. The side of body rib 500 at the upper splice plate 514 shares common fasteners 530 with the clevises 416, 426, 436 of the pin joints 210, 220, 230. The fittings 410, 420, 430 of the pin joints 210, 220, 230 are fastened to frames 122 of the fuselage 120.

Only the aft pin joint 230 is illustrated in FIG. 5. The forward and intermediate pin joints 210 and 220 may also be fastened between the fuselage 120 and wing assembly 130 as illustrated in FIG. 5.

A flexible shear plate 540 establishes a continuous connection (load path) between the wing assembly 130 and the fuselage 120. In the configuration of FIG. 5, the shear plate 540 has an S-shape. One side of the shear plate 540 may be attached to the upper splice plate 514 and to the side of body rib 500. Another side of the shear plate 540 is attached to a plurality of fuselage frames 122 via an L-shaped strap 550. Both the shear plate 540 and the L-shaped strap 550 extend in the axial direction to span several frames 122 and all of the pin joints 210-230.

The shear plate 540 has multiple roles. It transfers loads between the fuselage 120 and the wing assembly 130 along the axial direction, it seals a gap between the fuselage 120 and the wing assembly 130, and it allows rotation around the p-axis. The dashed lines in FIG. 5 illustrate the movement of the shear plate 540 during loading. The double-ended arrow represents motion about the p-axis during loading. The shear plate 540 progressively transfers loads along the p-axis preventing peaking at the aft pin joint 230. As a result, the shear plate 540 can reduce the size of the most highly loaded pin joint (the aft pin joint 230).

The shear plate 540 may be made of a composite material such as carbon fiber reinforced plastic (thermoset or termoplastic) with properties tailored to allow flexibility in rotation about the p-axis and be stiff enough to transfer load in the direction of the p-axis. The shear plate 540 may be segmented into multiple (e.g., three or more) sections for fail safety.

The pin joints 210-230 are located below and outside the fuselage 120 and on the upper wing surface which is typically covered by wing-to-body fairing. This location provides easy access for assembly and inspection. In addition, this location helps to better align the vertical loads between the wing assembly and the fuselage 120.

Locating the pin joints 210-230 outside of the fuselage 120 enables the location of the connection 150 to be varied, which introduces a design parameter that can be used to optimize where the wing vertical loads are introduced to the fuselage 120. Optimizing the pin locations can further reduce fuselage frame bending, for instance, by moving the connection to a better part of the fuselage that is tangential to the vertical load.

Because fuselage frame bending is reduced, lighter frames 122 for the fuselage 120 may be used. Less reinforcement material may also be used. Thus, aircraft weight is reduced.

The pinned fuselage-to-wing connection 150 offers other advantages. The use of multiple pins provides a fail-safe connection in the event that one of the pin joins were to fail. This also reduces weight compared to traditional pinned designs.

The invention claimed is:

1. An aircraft comprising:
    a fuselage;
    a wing assembly; and
    a pinned fuselage-to-wing connection including a forward pin joint constrained for partial translation in an axial direction, an aft pin joint constrained to prevent translation in the axial direction, and a plurality of intermediate pin joints between the forward and aft pin joints;
    wherein the intermediate pin joints have pins aligned in a forward to aft direction along a longitudinal axis, and the intermediate pin joints are configured to slide along the axial direction without transferring axial loads from the wing assembly to the fuselage.

2. The aircraft of claim 1, wherein the pinned fuselage-to-wing connection transfers vertical, lateral and axial loads to the fuselage, without inducing rotational loads in the fuselage due to wing assembly bending.

3. The aircraft of claim 1, wherein the fuselage includes a plurality of frames; and wherein each intermediate pin joint is connected between one of the frames and a side of body rib of the wing assembly.

4. The aircraft of claim 3, wherein the forward pin joint is also connected to a front spar of the wing assembly, and the aft pin joint is also connected to a rear spar of the wing assembly.

5. The aircraft of claim 4, wherein pins of the forward and aft pin joints are aligned with the pins of the intermediate pin joints.

6. The aircraft of claim 1, wherein each intermediate pin joint includes a lug and clevis, wherein lug-to-clevis spacing determines an amount of translation in the axial direction.

7. The aircraft of claim 1, wherein the fuselage-to-wing connection further includes a shear plate connected between the fuselage and the wing assembly, the shear plate is formed from a carbon fiber reinforced plastic having material properties that provide flexibility for rotation about the axial direction and provide stiffness to transfer a load in the axial direction.

8. The aircraft of claim 7, wherein one side of the shear plate is clamped to a side of body rib of the wing assembly, and another side of the shear plate is coupled attached to frames of the fuselage.

9. The aircraft of claim 7, wherein the shear plate extends in the axial direction and spans the pin joints.

10. The aircraft of claim 1, wherein the forward, intermediate and aft pin joints are outboard of the fuselage.

11. A connection for a wing and a fuselage of an aircraft, the connection comprising:
    a forward pin joint constrained for partial translation in an axial direction;
    an aft pin joint constrained to prevent translation in the axial direction; and
    a plurality of intermediate pin joints between the forward and aft pin joints, the intermediate pin joints having pins aligned in a forward to aft direction along a longitudinal axis, and are configured to slide along the axial direction without transferring axial loads.

12. The connection of claim 11, wherein pins of the forward and aft pin joints are aligned with the pins of the intermediate pin joints.

13. The connection of claim 11, wherein each intermediate pin joint includes a lug and clevis, wherein lug-to-clevis spacing determines an amount of sliding in the axial direction.

14. The connection of claim 11, further comprising a shear plate configured to be connected between the fuselage and the wing, wherein the shear plate is formed from a carbon fiber reinforced plastic having material properties that provide flexibility for rotation about the axial direction and provide stiffness to transfer a load in the axial direction.

15. The connection of claim 14, wherein the shear plate extends in the axial direction and spans the pin joints.

16. A connection for a wing and a fuselage of an aircraft, the connection comprising:
    a forward pin joint, an aft pin joint, a plurality of intermediate pin joints between the wing and the fuselage, and a shear plate;
    all of the pin joints having pins aligned along a p-axis;
    each pin allowing the wing to bend without inducing rotational deflection to the fuselage at the connection;
    the aft pin joint constrained to prevent translation along the p-axis;
    the shear plate having material properties that provide flexibility for rotation about the p-axis and stiffness to transfer axial loads along the direction of the p-axis to the fuselage.

17. The connection of claim 16, wherein all of the pin joints are located between a wing upper surface and the fuselage.

18. An aircraft comprising:
    a fuselage;
    a wing assembly; and
    a pinned fuselage-to-wing connection including a forward pin joint, an aft pin joint and a plurality of pin joints between the wing assembly and the fuselage, wherein the forward pin joint, the aft pin joint and the plurality of pin joints are aligned in a forward to aft direction along a p axis allowing the wing assembly to bend without inducing rotational deflection to the fuselage at the pinned connection, and wherein the forward pin joint is constrained for partial translation along the p-axis and the aft pin joint is constrained to prevent translation along the p-axis.

* * * * *